INVENTORS
BLOOMFIELD JAMES WARMAN
WILLIAM BERNARD DELLER

BY Lawson and Taylor

BINARY MAGNETIC STORAGE DEVICES OF THE MATRIX TYPE

Filed Aug. 27, 1959

INVENTORS
BLOOMFIELD JAMES WARMAN
WILLIAM BERNARD DELLER
BY

Jan. 22, 1963 B. J. WARMAN ETAL 3,075,183

BINARY MAGNETIC STORAGE DEVICES OF THE MATRIX TYPE

Filed Aug. 27, 1959 4 Sheets-Sheet 3

INVENTORS

BLOOMFIELD JAMES WARMAN

WILLIAM BERNARD DELLER

BY Lawson and Taylor

INVENTORS
BLOOMFIELD JAMES WARMAN
WILLIAM BERNARD DELLER

BY Larson and Taylor

United States Patent Office 3,075,183

Patented Jan. 22, 1963

3,075,183

BINARY MAGNETIC STORAGE DEVICES OF THE MATRIX TYPE

Bloomfield James Warman, Charlton, and William Bernard Deller, Mottingham, London, England, assignors to Associated Electrical Industries (Woolwich) Limited, a company of Great Britain Filed Aug. 27, 1959, Ser. No. 836,515
Claims priority, application Great Britain Sept. 2, 1958
5 Claims. (Cl. 340—174)

This invention relates to binary magnetic storage devices of the matrix type.

Such stores are well known and usually comprise a number of ferrite cores arranged in one or more matrices usually with separate conductors linked with all the cores in each row and separate conductors linked with all the cores in each column. The information is stored by reversing the remanent magnetism in the cores by means of currents passed simultaneously through the particular row conductor and column conductor linked with the core in question.

During reading interrogation currents are passed along the appropriate row and column conductors. These interrogation currents are in the reverse direction to the writing currents and, assuming the arrangement is such that the core is set (i.e. reversed) for a 1 but is not set for a 0, then action of the interrogation currents is such that if the information in the core in question, represents a 0, then there is no reversal of magnetism i.e. no resetting during sending. If however, the core is storing a 1, then the interrogation currents will reset the core and this will induce a signal in an output conductor which is linked with all the cores in series.

It will be appreciated that with such arrangements, when either writing or reading, the values of the line and column currents must be so chosen that individually they are incapable of reversing a core, so that they do not reverse any of the other cores in the same line and column as the selected core. However the combined action of the line and column currents at the point of intersection must be sufficient to effect this. In this way selection of a required core is carried out.

It follows, therefore, that both the writing currents and the interrogation currents must lie within certain specified limits. In the case of the writing currents this does not cause difficulty since they are only required to set the cores. However, in the case of the interrogation currents it would be desirable to pass large currents through a selected core in order to obtain a large output signal. This is desirable for the reason that in the selected row and column all the cores which are being interrogated, though not be actually reversed, will have their magnetism varied and these will cause small signals to be induced in the output conductor and in cases where there are a number of cores in a line and column these signals may add up and cause spurious signals which cause difficulty in the discrimination of the wanted signal at the output line. Whilst the effects of these spurious signals can be reduced to some extent by threading the output conductor through the cores in alternate directions in chosen rows and columns, nevertheless it is difficult to reduce them sufficiently and the read circuit must then discriminate for outputs of both polarity.

The main object of the invention is to provide a simplified arrangement which gives satisfactory discrimination of output signals in a binary matrix store.

According to the present invention a binary matrix store comprises a matrix array of two-state magnetic storage cores together with two-state magnetic driving cores associated with each column (or row) of storage cores and a read/write blocking oscillator circuit associated with each row (or column) the arrangement being such that during reading a selected drive core is actuated to the set state so that storage cores of the associated column (or row) which are already in the re-set state are changed to the set state whereby the blocking oscillators of the associated rows (or columns) are triggered and by their regenerative action provide an amplified and lengthened output signal and by their degenerative action revert to the untriggered state concurrently with the re-setting of the column (or row) drive core thereby re-setting those storage cores which during reading were set. It will be appreciated that the regenerative action of the blocking oscillators amplifies and lengthens the read current pulses from the associated columns (or rows) thereby providing directly usable output signals. The subsequent degeneration provides a rewrite current for the core stores.

Additional means may be provided for triggering a selected blocking oscillator or preventing the oscillator triggering during re-writing so as to change the information which is re-written into the matrix store from that which was read out from it.

According to a preferred arrangement the blocking oscillators comprise saturating transistor circuits with means for applying a tiggering voltage independently of the core store to trigger the blocking oscillator and means for applying a voltage to prevent the blocking oscillator being triggered by signals from the core store. Preferably each blocking oscillator includes a coupling transformer whereby it is coupled to the storage cores and a feedback transformer having its secondary winding connected in series with the secondary of the coupling transformer so that the induced current due to feedback assists the induced read current from the core store.

The driving cores of the core store function as current transformers whereby the storage cores are stimulated by a reading current of large amplitude and improved discrimination obtained. Moreover, during reading, the magnetic condition of the driving core is reversed (i.e. changed from the re-set to the set condition) thereby enabling the driving core to retain a memory of the group read.

Re-writing information back into the core can be performed on a half current basis in two co-ordinates one of which is formed by the read out circuit from the storage cores whiles the other is formed by the drive circuit from the driving core into the storage cores. Thus the same conductors can be used for re-writing as are used for reading. The half current in the drive circuit in such arrangements can be obtained by passing a re-write signal through all the drive cores in series in a direction to change the one set core back to the re-set condition (all other drive cores already being in the re-set condition).

The storage core output signal responsive circuits each take the form of a regenerative blocking oscillator circuit adapted to perform the functions of both reading the output signals from the storage cores and writing information back into the cores. The half current in the read out circuit can in such cases be obtained as a result of the regenerative action of the blocking oscillator output signal responsive circuit extending the duration and increasing the amplitude of the output signal obtained from the storage cores during reading.

The storage cores may be arranged to form a matrix each group with its drive core forming a column (or row) and the output lines the rows (or columns). A number of such matrices may be stacked to form a three dimensional array and a particular matrix may be selected by passing a hold off current through the drives cores of all the matrices except the selected one which is left in an operative condition, i.e. capable of reading and writing.

Provision may be made for the sequential scanning of the core storage groups in a selected matrix by means of a counting circuit arranged to step cyclically and effecting reading and writing operations alternately during each step of the counting circuit. In such cases the counting circuit would first set a group of storage cores for reading and then reset it for writing and then perform the same sequence with the next group.

The counting circuit stages may be connected to corresponding drive cores of each matrix but will have no effect on matrices other than the selected matrix.

Similarly the same output conductors may be linked with corresponding rows (if the columns are groups or vice versa) of all the matrices so that only one set of read write circuits is required. Here again only a selected matrix would be operative at any one time.

Clearly the information passed from a core may be changed externally and it does not follow that the information re-written will be the same as that which was read out.

In addition to the cyclical operations by the counter circuit provision may be made for random access to the core storage groups using a separate random access drive core with, and a third wire interlinking, the cores of each core storage group.

Preferably means are provided for interlacing the random and sequential access to the core storage groups.

In order that the invention may be more clearly understood reference will now be made to the accompanying drawings, in which.

Figure 1:
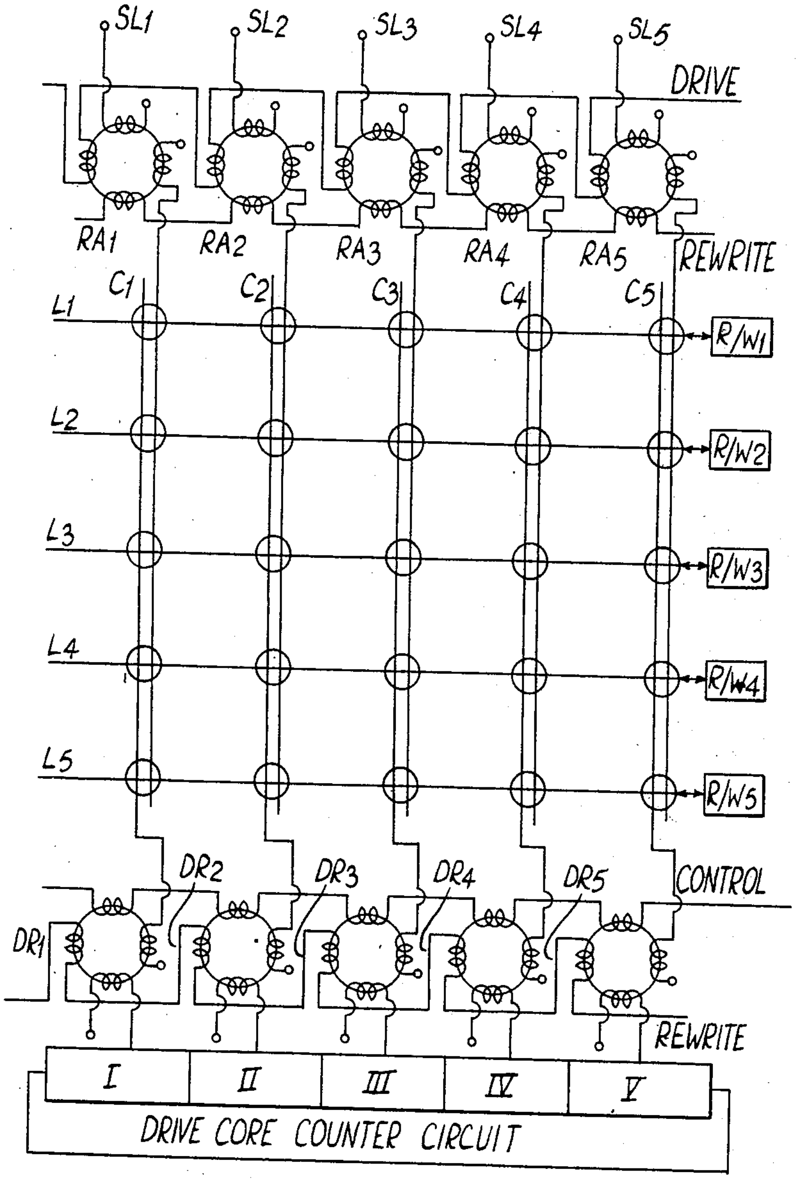
FIG. 1 is a simplified diagram explaining the action of a single matrix.

FIG. 1 is a diagrammatic view illustrating the principle underlying the invention and shows a matrix formed of five rows and five columns. It will be appreciated that normally there will be a number of such matrices in a store, as will be explained subsequently. At the junction of each of the row conductors L1–L5 and columns C1–C5 is a ferrite storage core. At the right hand ends of each of the rows are indicated the reading and writing circuits R/W1 to R/W5. Below the storage cores are shown a row of driving cores DR1–DR5. The right hand coil of each of these is connected to a column conductor and the lower coil is connected to the appropriate stage of a five stage counter circuit. The upper windings of the driving cores are connected in series with a control circuit and the left hand windings to a re-write circuit.

In operation a current would normally pass through the control circuit to hold all the driving cores biased to an off state in which they are inoperative. When a particular matrix is to be put into operation the current through the control circuit is removed so that all the driving cores of the particular matrix in question are operative. The counter circuit at the foot of the figure passes a read current through each column of storage cores in turn. Thus, when a current from stage 1 of the counter circuit passes through the bottom winding of the driving core DR1, this core will be turned over to the set state. In turning over it will induce a read current in the column conductor C1 and this will affect all the storage cores in the first column. If they are holding a signal, say a 1, then they will be turned over but there will be no action if they are holding no signal, i.e. if they indicate a 0, If a storage core is holding a 1, a signal will be fed along the appropriate line conductor to the read/write circuit concerned where it will be utilised and then unless changed in the external circuit, fed back to the storage core from which it has been extracted. The feeding back of the signal will coincide with a re-write current passed along all the left hand windings of the driving cores. The re-write signals will re-set, i.e. turn back, the particular driving core that has been turned over, i.e. DR1, in the example under consideration. The turning over of DR1 will send a current along the column conductor in the reverse direction so as to assist in turning back any of the cores to which a signal is being fed from the associated read/write circuits which current will be timed to coincide with the re-write signals.

This sequence of operations will then be repeated with column C2 and so on.

It will be appreciated that with this arrangement during reading, a large read current can be passed from the driving core through the storage cores so as to obtain a large output signal. Provision for selection is unnecessary as the read current passes through only the storage cores of the group which is being read and each of the cores of this group is connected to a separate read/write circuit.

At the same time interference with storage cores in other columns is avoided since during reading the drive cores turn over sequentially one at a time so that only one of the drive cores will provide a signal at any given time, and similarly, since re-writing alternates with reading, only the driving core which was turned over during reading can be turned back to its original state.

It will be appreciated also that in the above operation reading and writing of each of the columns will occur cyclically under the control of the driving core counter circuit.

Cases may arise in which it is desired to write a signal into a selected storage core and to enable this to be carried out there is a set of random access driving cores at the top of FIG. 1 designated RA1–RA5. These are associated with respective columns of storage cores in the same way as the driving cores shown at the foot of the column.

In order to write into a selected column of cores a current is passed through the top winding of the appropriate random driving core from one of the sources shown as SL1–SL5 causing the random driving core to set and pass a read out signal through its associated storage cores causing these to send output signals to their associated read/write circuits thus clearing the storage. The appropriate random driving core has now been set and the associated storage cores cleared of markings (i.e. all are in the re-set (0) state). A re-write pulse is now applied to the bottom windings of the random driving cores and co-incident with this, the read-write circuits are stimulated to adopt the new pattern of information which it is required to insert into the core storage group. The random driving core being re-set by the re-write current passes a half current to the cores of its associated group a further half current being obtained from the read/write amplifiers in accordance with the required storage pattern and the combined effect of these two currents sets the core storage group to the new pattern.

Alternatively, if it may be assumed that the storage group is already clear then the random drive core associated with the column can be set by a small current which does not set the storage cores and then a pulse can be applied to the rewrite line and simultaneously a signal applied from the read/write amplifier to write a pattern of information into the selected storage cores.

It will be appreciated that the operation of random access cores is exactly the same as that of the driving cores excepting that they are not operated cyclically. Means, however, should preferably be provided to ensure that the random access cores are only operated between the times that the driving cores are operated by the counter circuit to avoid any confliction and inaccuracies.

Figure 2:
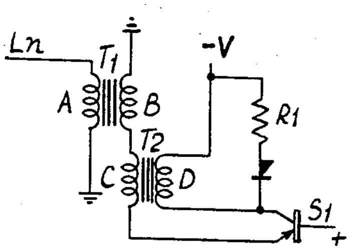
FIG. 2 shows a blocking oscillator arrangement which can form the basis of the Read/Write circuit.

Each of the read/write circuits preferably comprise a transistor blocking oscillator and a convenient form of this is shown in FIG. 2. If a small pulse is read out from one of the storage cores in the row concerned this will occur across the winding A which is the primary winding of transformer T1. A stepped up voltage will appear across the winding B sufficient to cause the emitter voltage of the transistor S1 to rise above the bias voltage.

The transistor S1 then begins to conduct and the collector voltage rises towards earth. The rise in collector voltage is coupled back via T2 to the emitter in such a way as to cause S1 to pass an increased current. The action then becomes re-generative, the collector voltage rising rapidly to earth and the collector current rising progressively during the duration of the pulse until the transformer is saturated. The increase in current necessary to assist the voltage across the winding D cannot then be supplied by the transistor and the collector voltage falls. This action is again re-generative and the transistor is rapidly cut off to terminate the pulse. During the pulse the emitter current passes through winding B and induces a stepped up current in winding A in such a direction as to tend to cause the storage core, which triggered the oscillator by turning over, to turn back to its original state. This pulse from the blocking oscillator will coincide with a pulse along the column conductor from the core in question obtained through the re-setting of the driving core associated with that column and thus the storage core in question will be turned back and the information thereby re-written into it.

An important feature of this arrangement is the use of the two transformers T1 and T2 with the secondary C of the feed-back transformer T2 connected in series with the secondary of the coupling transformer T1 and in such a direction that the induced current in C due to feed back assists the read current induced in B by the storage core which is being read.

It will be appreciated also that information can be written into a specified position in the store during the cyclic operation by triggering the blocking oscillator with a positive pulse on the emitter at the appropriate time in the case of a 1 or raising the positive bias on its base to prevent the triggering in the case of the 0.

These actions must, of course, coincide with the resetting of the appropriate driving core or writing core.

In order to allow time to process stored information, i.e. perform computations etc., the half re-write pulse should preferably be timed to occur near the end of the blocking oscillator pulse. The information can then be read out of the core, and if it is wished to change a 0 to a 1 then the blocking oscillator can be triggered; if it is required to change a 1 to a 0 then the blocking oscillator can be quenched. In either case this must be done prior to onset of the rewrite pulse.

It will be understood that when a blocking oscillator changes from its reading to its re-writing function it must reverse the voltage which was developed across its input by the applied read signal current. In addition by its regenerative action the blocking oscillator must amplify and lengthen the duration of the read current signal, so that the read and write drives applied to the storage cores can follow one another. With the proposed blocking oscillator using direct transformer feedback between the collector and emitter electrodes of the transistor, since the read current signal applies a positive potential to the emitter electrode to cause the transistor to conduct the ohmic voltage drop across the secondary of the feedback transformer due to the initial current flow in the emitter circuit drives the emitter end of this winding negative with respect to its other end. The initial current flow through the transistor initiates the regenerative action of the circuit and the positive going voltage pulse transformer is induced into the secondary winding as to drive the emitter end of this winding positive, the secondary feedback winding now acting as the generator to maintain and amplify the flow of emitter current. In this way the blocking oscillator automatically reverses the voltage developed across the secondary of the feedback transformer. The regenerative action continues until the feedback transformer is saturated when the increase in current necessary to sustain the voltage across the primary of the feedback transformer cannot be maintained and the collector voltage begins to fall, thus initiating a degenerative action which rapidly drives the transistor to cut-off to terminate the pulse. To achieve the required voltage change in the emitter circuit due to the read out signal from the matrix and also to achieve the required current amplification for re-writing back into the matrix a separate coupling transformer is used having a primary to secondary step up ratio to provide the required voltage step-up in the forward direction of the transistor and also to provide a step down ratio in the reverse direction to provide the required current amplification. The blocking oscillator will be further described.

Figure 3:
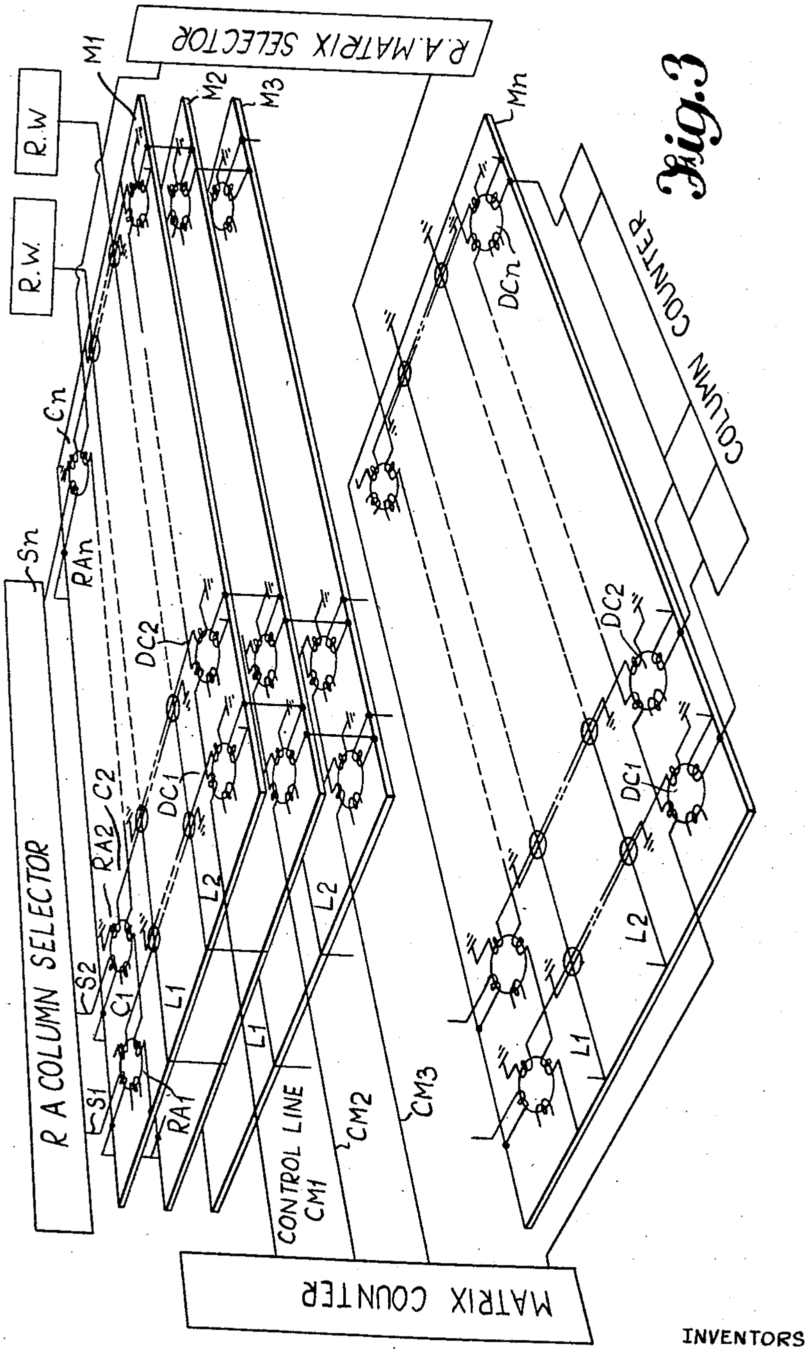
FIG. 3 shows how a number of matrices can be stacked to form a store.

FIG. 3 shows how a store can be constructed of a number of matrices of the kind shown in FIG. 1 stacked one over the other. The matrices are indicated as M1, M2, M3 and $M_n$. In order to simplify the drawing each matrix is shown with two rows of storage cores only though in actual practice there would be a considerably greater number. The matrix counter circuit shown on the left controls the control circuits of the driving cores and passes currents through the matrix control lines CM1, CM2 so as to bias all the driving cores to an off or inoperative state except those of a selected matrix in which the driving cores would be rendered operative and the action of the matrix counter circuit is to render each of the matrices operative in turn. The drive core counter circuit, as explained in connection with FIG. 1, operates each driving core of the selected matrix in turn. The circuit from the counter circuit, however, includes windings on all the corresponding driving cores of each matrix.

Thus, the first stage will include all the first driving cores which, in the actual construction, are arranged one over the other. However, driving cores of the matrices other than the one concerned will be held inoperative by the matrix counter circuit. Thus, each matrix will be selected in turn. At the top of FIG. 3 is shown the random access column selector and at the right is shown the random access matrix selector.

As explained previously, the matrix selector will select the appropriate matrix and the column selector will select the required column in the selected matrix.

It will be observed that the column counter and column selector are connected with a corresponding column in each matrix.

Thus, the first stage of the column counter is connected to the DC1 driving core of each matrix and similarly the first stage of the RA column selector is connected to the RA1 core of each matrix.

It will also be noted that the read/write lines connect all the storage cores of corresponding lines in series. Thus, the line L1 connects all the first lines of each matrix in series to a common read/write circuit.

Figure 4:
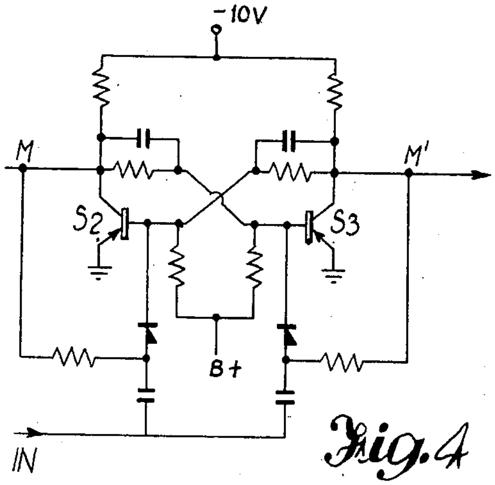
FIG. 4 shows a circuit suitable for one stage of the counter.

FIG. 4 shows a suitable circuit for a stage of the matrix counter. The circuit shown comprises two transistors S2 and S3 which are cross connected to form a bi-stable circuit. At any instant one of the transistors will conduct and the other be cut off. Successive pulses applied to the input terminal will cause the circuit to alternate between the two states and on alternate changes pulses will be applied from the output circuit to the input of the next stage. The points marked M, M′ can be connected to pass the control signal to select the matrix.

The matrix counter will be stepped forward one by a pulse applied from the column counter each time the latter reaches the end of a count.

Figures 5, 6:
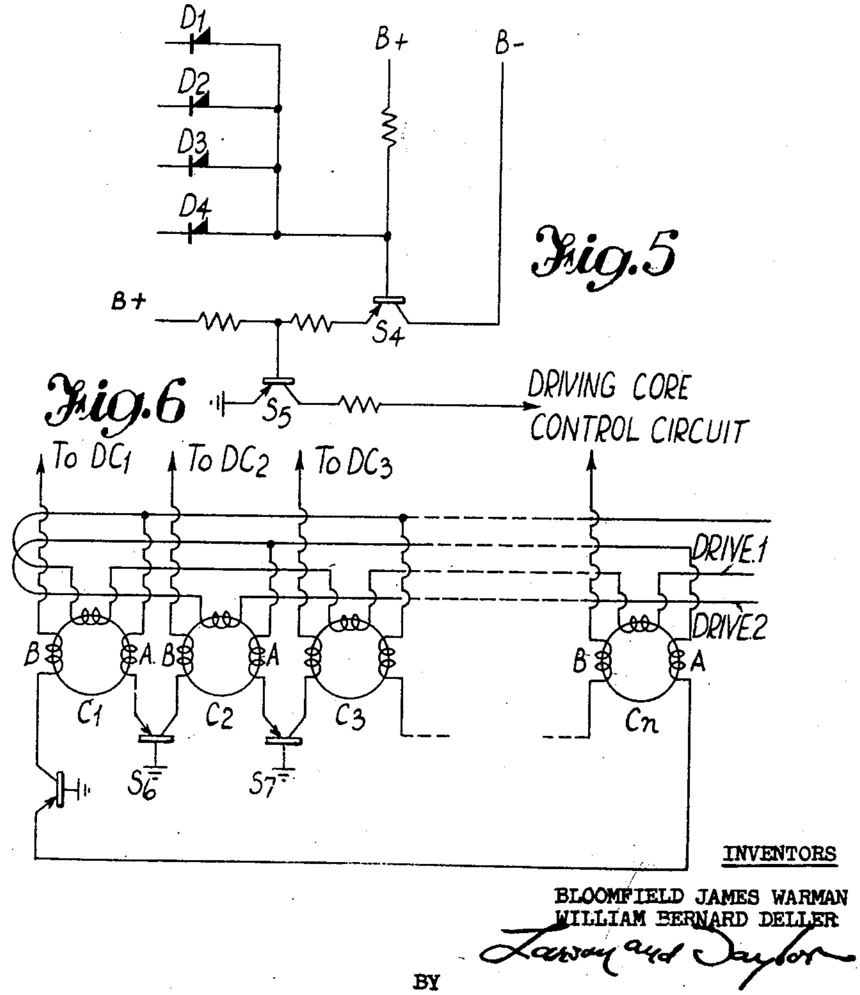
FIG. 5 shows a coding circuit which can be used in conjunction with FIG. 4.
FIG. 6 shows a suitable circuit for the column counter.

One way of applying the control signals is by means of the coding circuit shown in FIG. 5, of which there will be one for each matrix. This arrangement assumes a four stage counting circuit and the stages will be connected respectively to the diodes D1, D2, D3 and D4. Depending upon which side of the bi-stable circuit they are connected they can be made to respond to a 0 or a 1. In accordance with an appropriate code the transistor S4 will control S5 so that it is held on or off, and interrupts the current through the driving core control circuit of the matrix associated with the coding circuit concerned. S4 and S5 are so arranged that when S4 is on then S5 is off and vice versa.

Such an arrangement enables a small number of stages of counter circuit to operate a larger number of matrices.

FIG. 6 shows a suitable circuit for the column counter. This is a sequence circuit using ferrite cores. There are a series of cores C1, C2, . . . $C_n$ which operate in sequence and two drive circuits operated alternately.

Assuming for a starting position that winding B of C1 is energised so that current flows to DC1, then when current flows through the drive "1" circuit, core C1 will turn over; this will cause a pulse to pass through winding A of C1 which will be amplified by S6 and will flow through winding B of C2 to DC2 which will pass a read current to its associated cores.

At the same time the current through B of C1 will be cut off through the emitter circuits of transistor S6. The next driving pulse through drive 2 will turn over C2 and cause current to flow from C3 to DC3.

This action is progressed through the cores successively, the last core in the sequence $C_n$ sending a current through winding B of C1 so that the circuit operates cyclically.

Figure 7:
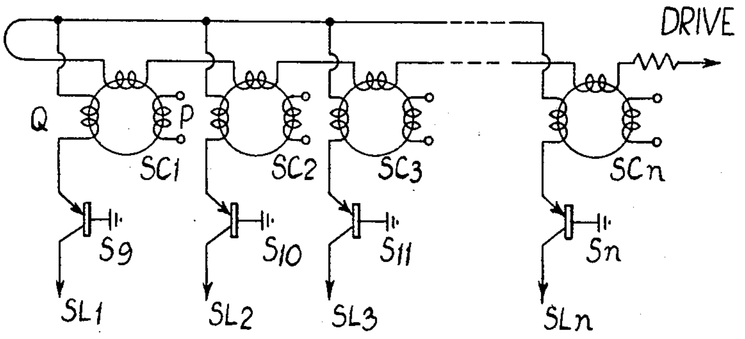
FIG. 7 shows a suitable arrangement for the selector circuits.

FIG. 7 shows a suitable circuit arrangement for the random access selector circuit. There is a core SC1, SC2 . . . associated with each column (or matrix). Assume that column 1 is to be selected then winding P of SC1 will be energised and current passed through the drive circuit. A current will then be induced in winding Q and this will pass through the amplifier transistor S9 to core RA1.

Figure 8:
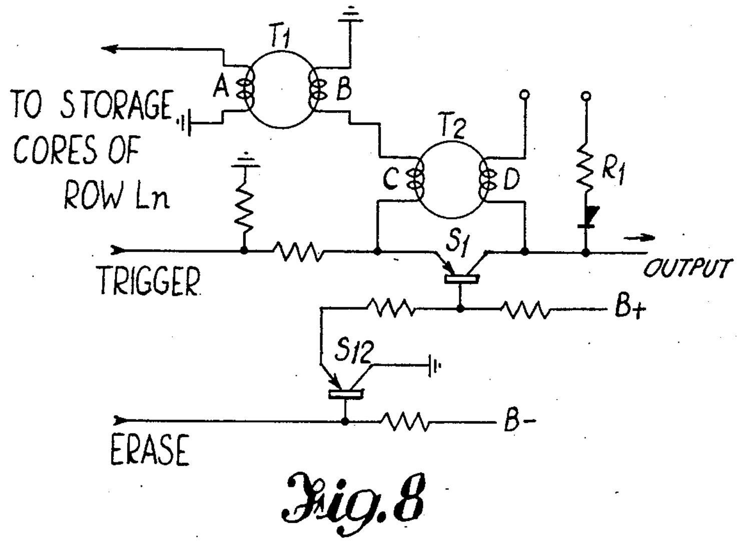
FIG. 8 shows one form of Read/Write circuit.

FIG. 8 shows a suitable read/write circuit. This is a development of FIG. 2 and the transistor S1 operates a second transistor S12.

Trigger pulses are applied along the line marked "Trigger"; these are applied to the emitter of S1 and will trigger the circuit so that where a 0 has been read out from the store a 1 will be re-written when the re-write pulse is applied to the column drive core. Erase pulses are applied along the conductor marked "Erase." These will quench the oscillator so that in cases in which a 1 has been read a 0 will be re-written.

The output from the blocking oscillator can conveniently operate a bi-stable circuit which feeds a 1 or a 0 as the case may be to an arithmetic unit. The arithmetic unit in turn will apply a pulse to the "Trigger" or "Erase" circuit depending upon whether a 1 or a 0 is to be fed into the store.

Whilst the storage cores are separate functionally they need not be physically separate, but may be formed by threading conductors through spaced apertures in a ferrite board in a manner which is well known.

What we claim is:

1. A binary matrix store comprising an array of two-state magnetic storage cores located along two sets of intersecting lines to form a rectangular matrix, a separate two-state magnetic drive core associated with each individual line of cores of the first set and coupled thereto by a drive core conductor, a separate regenerative blocking oscillator associated with each line of cores of the second set and coupled thereto by a blocking oscillator conductor, means for actuating a selected drive core to the set state during a reading operation to generate a pulse in the associated drive core conductor which changes to the set state those storage cores coupled thereto which are in the re-set state, means actuated by the changing of a storage core from the re-set to the set state to generate a pulse in the associated blocking oscillator conductor which is applied to trigger the associated blocking oscillator, means effective after a predetermined time interval to cause a triggered blocking oscillator to automatically revert to its original state and thereby apply a re-set signal to the same storage core and means for applying a complementary re-set signal concurrently along the drive core conductor associated with the storage core in question.

2. A binary matrix store comprising an array of two-state magnetic storage cores located along two sets of intersecting lines to form a rectangular matrix, a separate two-state magnetic drive core associated with each individual line of cores of the first set and coupled thereto by a drive core conductor, a separate regenerative blocking oscillator associated with each line of cores of the second set and coupled thereto by a blocking oscillator conductor, means for actuating a selected drive core actuated to the set state during a reading operation to generate a pulse in the associated drive core conductor which thereby changes to the set state those storage cores coupled thereto which are in the re-set state, means actuated by the changing of a storage core from the re-set to the set state to generate a pulse in the associated blocking oscillator conductor which is applied to trigger the associated blocking oscillator, means effective after a predetermined time interval to cause a triggered blocking oscillator automatically to revert to its original state and thereby applies a re-set signal to the same storage core and means for applying a complementary re-set signal concurrently along the drive core conductor associated with the storage core in question, means for preventing the triggering of a blocking oscillator by a storage core signal and means for triggering a blocking oscillator independently of storage core signals to re-write into a storage core a signal different from the signal read.

3. A binary matrix store comprising an array of two-state magnetic storage cores located along two sets of intersecting lines to form a rectangular matrix, a separate two-state magnetic drive core associated with each individual line of cores of the first set and coupled thereto by a drive core conductor, a separate regenerative transistor blocking oscillator associated with each line of cores of the second set and coupled thereto by a blocking oscillator conductor, means for actuating a selected drive core to the set state during a reading operation and thereby generate a pulse in the associated drive core conductor which thereby changes to the set state those storage cores coupled thereto which at that time are in the re-set state, means actuated by the changing of a storage core from the re-set to the set state to generate a pulse in the associated blocking oscillator conductor which is applied to trigger the associated blocking oscillator, means effective after a predetermined time interval to cause a triggered blocking oscillator automatically to revert to its original state and thereby apply a re-set signal to the same storage core and means for applying a complementary re-set signal concurrently along the drive core conductor associated with the storage core in question, said transistor blocking oscillators each comprising a regenerative feedback transformer and a coupling transistor coupling the blocking oscillator with the storage core line and a series connection between the transformer secondary windings for applying the induced voltage due to feedback to assist the signal from the storage core.

4. A binary matrix store comprising an array of two-state magnetic storage cores located along two sets of intersecting lines to form a rectangular matrix, a separate two-state magnetic drive core associated with each individual line of cores of the first set and coupled thereto by a drive core conductor, a separate regenerative blocking oscillator associated with each line of cores of the second set and coupled thereto by a blocking oscillator conductor, means effective during a reading operation to actuate a selected drive core to the set state and thereby generate a pulse in the associated drive core conductor which thereby changes to the set state those storage cores coupled thereto which are in the re-set state, means for generating a pulse in the associated blocking oscillator conductor when a storage core is set which pulse is applied to trigger the associated blocking oscillator, means for causing a triggered blocking oscillator automatically to revert to its original state after a predetermined time interval and thereby apply a re-set signal to the same storage core, means for applying a complementary re-set signal concurrently applied along the drive core conductor associated with the storage core in question and means for preventing triggering of a blocking oscillator by a storage core signal and means for triggering a blocking oscillator independently of the storage core signal to re-write a signal different from the signal read and means for actuating the drive cores sequentially.

5. A binary matrix store comprising an array of two state magnetic storage cores located along two sets of intersecting conductor lines to form a matrix, a separate two state magnetic drive core associated with each individual line of the first set of core lines and operatively coupled thereto, a separate regenerative blocking oscillator coupled to each line of the second set of core lines, means effective during a reading operation for actuating a selected drive core to the set state thereby to generate a pulse in the associated line and reset all storage cores coupled to said line which are then in the set state, means actuated by the resetting of said storage cores for triggering the associated blocking oscillators, means whereby said blocking oscillators after a predetermined time interval, if unchanged, apply reset signals to the same said storage cores, means for resetting said selected drive core to apply a complementary reset signal to said storage cores concurrently with the reset signal from the blocking oscillator, means for preventing the triggering of a blocking oscillator by a storage core signal and means for triggering a blocking oscillator independent of storage core signals to rewrite into a storage core a signal different from the signal read.

References Cited in the file of this patent

UNITED STATES PATENTS

| | | |
|---|---|---|
| 2,856,596 | Miller | Oct. 14, 1958 |
| 2,910,674 | Wittenberg | Oct. 27, 1959 |
| 2,917,727 | Reach | Dec. 15, 1959 |
| 2,922,145 | Bobech | Jan. 19, 1960 |